UNITED STATES PATENT OFFICE.

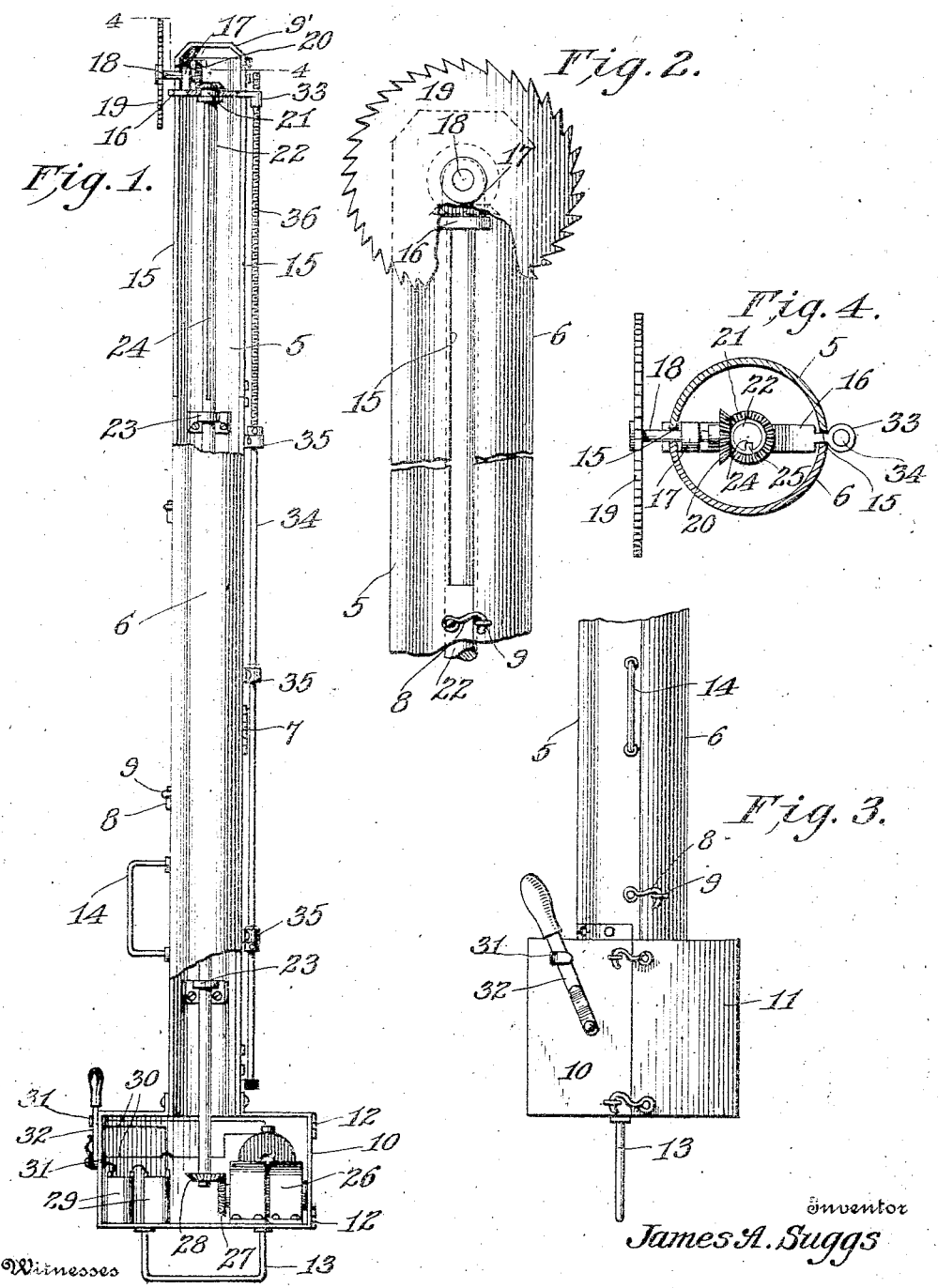

JAMES A. SUGGS, OF SAFETY HARBOR, FLORIDA, ASSIGNOR OF ONE-FOURTH TO JOHN D. JORDAN, OF ST. PETERSBURG, FLORIDA, AND ONE-FOURTH TO JENNIE PHINNY, OF WASHINGTON, DISTRICT OF COLUMBIA.

PRUNING IMPLEMENT.

1,124,552.  Specification of Letters Patent.  Patented Jan. 12, 1915.

Application filed June 29, 1914. Serial No. 847,854.

*To all whom it may concern:*

Be it known that I, JAMES A. SUGGS, a citizen of the United States, residing at Safety Harbor, in the county of Pinellas and State of Florida, have invented certain new and useful Improvements in Pruning Implements, of which the following is a specification, reference being had to the accompanying drawings.

This invention relates to an improved pruning implement and has for its primary object to produce a device of this character whereby the pruning of fruit trees and the like may be expeditiously performed.

The invention has for a more specific object to provide a device of the above character including a pole, a rotary saw mounted upon one end of said pole, and novel means for adjusting the saw longitudinally upon the pole, whereby the same may be easily engaged with tree limbs at various heights above the ground.

The invention has for an additional object to provide a pruning implement having an electrically operated rotary saw which is mounted and operated from means carried by the pole in such manner as to enable the device to be easily handled by the operator and moved from place to place.

With the above and other objects in view, the invention consists in the improved construction, combination and arrangement of the several parts as hereinafter fully described and pointed out in the appended claims.

In the accompanying drawing, wherein I have illustrated the preferred embodiment of my invention, and in the several views of which similar parts are designated by like reference characters, Figure 1 is a side elevation, parts of the casing being broken away, of a pruning implement constructed in accordance with my invention. Fig. 2 is an elevation of the upper end portion of the device looking at right angles to Fig. 1. Fig. 3 is a similar view of the lower end of the device, and Fig. 4 is a section taken on the line 4—4 of Fig. 1.

Referring in detail to the drawing, 5 and 6 designate the two semi-cylindrical sections of the pole upon which the rotary saw, and operating and adjusting means therefor, to be later described, are mounted. These pole sections are preferably constructed of sheet metal, and are hingedly connected along one of their longitudinal edges, as shown at 7. The other longitudinal edge of one of the pole sections is provided with hooks or analogous fastening elements 8 for engagement in eyes 9 on the corresponding edge of the other pole section.

The two pole sections, at one of their ends, are formed or provided with cap or crown plates 9', which close the hollow pole when the sections 5 and 6 are fastened together. The other end of this hollow pole is open, and to one section thereof a casing or housing section 10 is secured. A movable casing section 11 is hinged at one of its ends as at 12 upon the section 10. A suitable handle member 13 is secured to the casing section 10, and an additional handle 14 is secured upon the pole section 5. By means of these handles, the operator may conveniently manipulate the implement.

The casing section 5 is provided at its upper end and in its opposite edges with longitudinally extending slots 15 in which the ends of a horizontally disposed plate 16 are loosely engaged. This plate is provided with a bearing 17 to receive the shaft 18 which projects outwardly through one of the slots 15. Upon the outer end of said shaft the rotary saw blade 19 is suitably secured. On the inner end of the shaft 18 a beveled gear 20 is secured and meshes with a similar gear 21 which is rotatably mounted in a central opening provided in the plate 16. This gear 21 is formed with a central bore to receive the longitudinally extending shaft 22, which is mounted to rotate in the spaced brackets or bearing members 23 fixed to the pole section 5. The upper end of this shaft is formed with a longitudinal key-way 24 in which a key 25 on the gear 21 is slidably engaged.

Within the casing or housing on the lower end of the hollow pole, an electric motor 26 is arranged upon the shaft to which a beveled gear 27 is fixed and meshes with a pinion 28 secured upon the lower end of the shaft 22. This motor is fed from batteries 29 also arranged within the housing or casing. The feed wires shown at 30 are suitably connected to spaced contacts 31 mounted in the wall of the casing and insulated therefrom. A movable switch lever 32 is in electrical conductivity with one of these contacts, and is adapted to be shifted into or out of engagement with the other contact when it is desired to open or close the circuit as will be readily understood.

The end of the plate 16 opposite to the rotary saw blade 19 projects through the other of the longitudinal slots 15 in the pole section 5 and is formed with a threaded sleeve 33. A longitudinally extending rod 34 is rotatably mounted in the spaced bearing brackets 35 secured upon the pole section 5. The upper end portion of this rod is threaded as at 36 for engagement in the sleeve 33. It will be manifest from this construction that by simply rotating the rod 34 the operator may shift the saw 19 either inwardly or outwardly upon the outer pole.

From the foregoing description, taken in connection with the accompanying drawing, the construction, manner of operation, and several advantages of the invention will be clearly and fully understood. When it is desired to trim the upper or top branches of the tree, the rotary saw 19 is disposed at the extreme upper end of the pole, as illustrated in the drawing. The greatest weight of the device is upon the lower end of the pole which may be mounted in a suitable support strapped to the body of the operator, whereby the operator can swing the same to various positions. The switch lever 32 being moved to close the circuit, the motor 26 operates to rotate the shaft 22 which in turn rotates the saw blade carrying shaft 18. The edge of the blade being engaged with the tree limb, the same will be quickly severed. It frequently occurs that the lower branches of the tree, which it is desired to cut off, are practically inaccessible because of the thick growth of the limbs, and in many instances, as the pole cannot be placed in a perpendicular position immediately beneath the limb to be cut, the limb must be severed with an ordinary hand saw. By means of my invention, however, when it is desired to cut the lower limbs of the tree, it is only necessary to turn the rod 34 to move the saw-carrying plate 16 inwardly upon the pole to the desired position, which will enable the operator to engage the saw with the tree limb. It is to be understood that saw blades of various diameters are provided for use in connection with the invention, and these blades are changed in accordance with the character of the tree to be operated upon, and the diameter of its limbs.

From the above it will be appreciated that I have produced an exceedingly serviceable as well as durable and convenient implement, which will relieve the operator of considerable manual labor. By means of my invention a large number of trees may be expeditiously and thoroughly pruned or trimmed. The entire operating mechanism for the saw being entirely housed within the hollow pole, it is protected against possible injury, thus reducing the expense incident to repairs to a minimum. At the same time, however, by constructing the pole in the two hingedly connected sections, access may be readily obtained thereto in order to renew the batteries or for making necessary repairs.

While I have above described the preferred construction and arrangement of the several elements employed, it will be understood that the invention is susceptible of considerable modification therein, and I therefore reserve the privilege of resorting to all such legitimate modifications as may be fairly embodied within the spirit and scope of the appended claims.

What I claim is:

1. A pruning implement including a hollow pole, a rotary saw, supporting means for said saw longitudinally movable upon the pole, a shaft rotatably mounted within the pole for operating the saw, and means mounted upon the exterior of the pole and coöperating with the saw support for adjusting the same longitudinally with respect to the pole.

2. A pruning implement including a hollow pole, a plate longitudinally movable upon the pole and extending transversely therethrough, a rotary tool mounted upon said plate, a gear journaled in the plate, a gear on the shaft meshing with said first-named gear, a longitudinal shaft mounted within the pole, said first-named gear being keyed for sliding movement on said shaft, and a longitudinally extending rod mounted upon the exterior of the pole and having a threaded portion engaged in said plate whereby the same and the rotary tool may be shifted longitudinally upon the pole.

In testimony whereof I hereunto affix my signature in the presence of two witnesses.

JAMES A. SUGGS.

Witnesses:
M. C. LYDDANE,
G. C. LYDDANE.